(12) United States Patent
Bouchard et al.

(10) Patent No.: US 8,347,270 B1
(45) Date of Patent: Jan. 1, 2013

(54) SELF-ASSEMBLED SOFTWARE AND METHOD OF OVERRIDING SOFTWARE EXECUTION

(75) Inventors: Ann M. Bouchard, Albuquerque, NM (US); Gordon C. Osbourn, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1119 days.

(21) Appl. No.: 11/923,764

(22) Filed: Oct. 25, 2007

Related U.S. Application Data (63) Continuation-in-part of application No. 10/456,115, filed on Jun. 5, 2003, now abandoned.

(51) Int. Cl.
*G06F 9/44* (2006.01)
*G06F 9/45* (2006.01)

(52) U.S. Cl. ......... 717/130; 717/107; 717/127; 717/148
(58) Field of Classification Search .................. None
See application file for complete search history.

(56) References Cited

U.S. PATENT DOCUMENTS

| | | | |
|---|---|---|---|
| 6,625,730 B1 * | 9/2003 | Angelo et al. ................. 713/2 |
| 6,754,883 B2 * | 6/2004 | DeBusk et al. ............... 717/107 |
| 6,957,415 B1 | 10/2005 | Bouchard et al. |
| 7,240,335 B2 * | 7/2007 | Angel et al. .................. 717/130 |
| 7,275,239 B2 * | 9/2007 | Cuomo et al. ................ 717/130 |
| 7,290,246 B2 * | 10/2007 | Cyran et al. .................. 717/130 |
| 7,712,085 B2 * | 5/2010 | McCollum et al. ............ 717/130 |
| 7,827,535 B2 * | 11/2010 | Maron .......................... 717/127 |
| 2002/0194482 A1 * | 12/2002 | Griffin et al. ................. 713/176 |
| 2003/0023856 A1 * | 1/2003 | Horne et al. .................. 713/187 |
| 2003/0056199 A1 * | 3/2003 | Li et al. ......................... 717/127 |
| 2003/0101439 A1 * | 5/2003 | Desoli et al. .................. 717/148 |

OTHER PUBLICATIONS

Lee et al., Improved authentication key exchange protocol without using one-way hash function, Apr. 2004, 8 pages, <http://delivery.acm.org/10.1145/1000000/991139/p85-lee.pdf>.*
Huang et al., Fast authenticated key establishment protocols for self-organizing sensor networks, Sep. 2003, 10 pages, <http://delivery.acm.org/10.1145/950000/941371/p141-huang.pdf>.*
Zhou et al., An efficient digital signature using self-certified public keys, Nov. 2004, 4 pages, <http://delivery.acm.org/10.1145/1050000/1046300/p44-zhou.pdf>.*

* cited by examiner

*Primary Examiner* — Thuy Dao
(74) *Attorney, Agent, or Firm* — Blakely Sokoloff Taylor & Zafman LLP (57) ABSTRACT

A computer-implemented software self-assembled system and method for providing an external override and monitoring capability to dynamically self-assembling software containing machines that self-assemble execution sequences and data structures. The method provides an external override machine that can be introduced into a system of self-assembling machines while the machines are executing such that the functionality of the executing software can be changed or paused without stopping the code execution and modifying the existing code. Additionally, a monitoring machine can be introduced without stopping code execution that can monitor specified code execution functions by designated machines and communicate the status to an output device.

17 Claims, 10 Drawing Sheets

SELF-ASSEMBLED SOFTWARE AND METHOD OF OVERRIDING SOFTWARE EXECUTION

This application is a continuation-in-part application of U.S. patent application Ser. No. 10/456,115, entitled "Software External Override Method" filed on Jun. 5, 2003, now abandoned and claims priority to and the benefit of the filing of said U.S. patent applications. The specification and claims thereof are incorporated herein by reference.

OTHER RELATED APPLICATIONS

"Method for self-organizing software," U.S. Pat. No. 6,957,415, assigned to the same assignee as that of the present invention.

This invention was made with Government support under Contract No. DE-AC04-94AL85000 awarded by the Department of Energy. The Government has certain rights in the invention.

BACKGROUND OF THE INVENTION

The invention describes a method for executing software within a hierarchical software system and to a method of overriding software execution with a hierarchical software system.

Many hierarchical software systems are designed level by level using object-oriented designs that define the classes of objects of an application and their interrelationships. Associated with each class is a set of operations that can be performed on its objects, plus the set of object attributes. In the object-oriented design approach, code and data that belong together can be combined into objects. The objects are interconnected with each other within a level and to other levels. The objects are treated essentially as black-box modules that are utilized in various configurations to perform higher-level functions. The object-oriented designs can be used to form complex domains with layers or modules that can be interchangeable. Software architecture systems of enormous complexity can thus be formed. However, like most software systems, the object modules are actuated by direct calls from other modules and perform only designated and non-changeable functions.

Software systems are required which are dynamic and hierarchical, where the software has modular flexibility in handling large classes of problems but can also be easily modified to address other problem classes or modifications within the problem classes. Software architecture is required that minimizes user interfaces at the code generation level and that does not require in-depth problem definition. The software system of the present invention provides a flexible and hierarchical architecture that is dynamic and non domain-specific.

DESCRIPTION OF SPECIFIC EMBODIMENTS

The present invention relates to a computer-implemented self-organized software system where sets of software building blocks, herein called machines, actively participate (self-assemble) in the construction and subsequent modification of the larger-scale programs of which they are a part and a method of performing a function using the self-assembly of these machines. As part of this computer-implemented software system, the present invention also incorporates a method of overriding an execution sequence in the self-organized software system. The machines interact through a software analog of selective protein-protein bonding. Self-assembly of these machines generates hierarchical modules (including both data and executables), creates software execution pathways, and concurrently executes code via the formation and release of activity-triggering bonds. Hierarchical structuring is enabled through encapsulants that isolate populations of machine binding sites. The encapsulated populations act as larger-scale building blocks for the next hierarchy level. Encapsulant populations are dynamic, as machines can move in and out of the encapsulant. Such movement changes the populations of interacting sites and also modifies the software execution. External overrides, analogous to protein phosphorylation, can be introduced in the method of the present invention as machines to temporarily or permanently switch off undesired subsets of behaviors (code execution, data access/modification) of other structures. This method provides the means for modifying and monitoring the existing software execution while the software system is functioning.

The dynamically self-assembling software system of the present invention provides means for creating, re-using, and maintaining software. The system contains machines that self-assemble execution sequences and data structures. In addition to ordered functions calls (found commonly in other software methods), mutual selective bonding between bonding sites of machines actuates one or both of the bonding machines. Bonding between machines' sites can be deterministic or stochastic with event times that can be assigned. Bonding site selectivity is enforced using matching of complementary keys at the pair of bonding sites. After bonding triggers actuation, a deterministic sequence of actions can be implemented by each machine. Sites become unbound either stochastically, with event times that can be assigned, or deterministically, after all of the machines' actions are completed. A self-assembled execution sequence is a sequence of stochastic binding between machines followed by their deterministic actuation. It is the sequence of bonding of machines that determines the execution sequence, so that the sequence of instructions need not be contiguous in memory.

Two or more machines can be virtually isolated by a construct called an encapsulant. An encapsulant contains a population of machines and potentially other encapsulants that can only bond with each other. A hierarchical software structure can be created using nested encapsulants. Multi-threading is implemented by populations of machines in different encapsulants that are interacting concurrently. Machines and encapsulants can move in and out of other encapsulants, thereby changing the functionality.

The software system of the present invention provides the means for modifying and monitoring the existing software; this can be done without modifying the original source code and can be done while the software is executing. An existing execution sequence can be modified (overridden) by changing keys of the existing machines and typically inserting additional machines with matching keys.

Because the software system of the present invention comprises novel constructs, the following terminology is defined:

- Machine: a software system element comprising at least one bonding site and at least one submachine part consisting of one of a data storage means for storing data, actuating means for executing commands, and control means for controlling activation of a machine or submachine.
- Submachine: an element consisting of one of a data storage means for storing data, actuating means for executing commands, and control means for controlling activation of a machine or submachine.
- Bonding Site: mechanism for allowing communication between machines. Each bonding site contains an identifier key that identifies the bonding site and allows one bond with another individual, complementary bonding site at any time. In general, a bonding site is associated with a submachine.
- Encapsulant: a virtual isolating environment comprising at least two machines that perform a function or process.
- Bond: a communication that forms when the key on one machine matches a complementary key on another machine.
- Identifier key: an identification means for a bonding site on a machine that when matched with a complementary identifier key, forms a bond.
- External stimulus: information introduced into an information manager that translates the information into a machine, key change, or data passed to a bound machine.
- Information manager: means that translates information into (a) key changes, or (b) signals to (i.e. data passed to) machines bound to the information manager, or (c) a machine, or similar means to one knowledgeable in the art; the means can be a user or software, where the software can itself be a machine.
- Event: the making of a bond or breaking of a bond.
- Event manager: software that controls the ordering of the making or breaking of bonds.

Dynamic self-assembly is a ubiquitous process in non-equilibrium physical and biological systems. The software system of the present invention creates an artificial system that dynamically self-assembles into hierarchical structures. A central result here is that a variety of software self-assembly processes become available by emulating physical self-assembly. Physics-emulating self-assembly can generate data structures, multiple kinds of executable code structures, dynamic execution pathways, hierarchies of software modules, movement of modules within the hierarchy and triggers that execute or inhibit certain code structures. These processes can also dismantle any structure that has been assembled.

The concept of bonding is utilized in the present approach. Physical notions of bonding, as they occur in biology (i.e. strong covalent bonds and weak protein-protein bonds), are utilized in forming the software architecture. The "strong" software bonding mechanism directly builds long-lived software structures. These lead to software structures with parts that execute sequentially and deterministically. "Weak" bonding is a more active process that not only assembles executable software structures but also triggers their execution. The weakly-bonded structures and the code execution pathways associated with them are transient. Further, weak bonds can be used to interfere with the action of other bonding processes on the same structure. This type of override is analogous to protein phosphorylation. This provides functionality that is distinct from object-oriented inheritance as it allows removal of unwanted functionality from the "outside" of the existing software structure. This additional flexibility can be useful for enhancing software reuse.

Weak bonding occurs at bonding sites. Each site allows at most one bond with another individual site at any time. These sites have identifier, typically numerical, keys that only allow bonding with complementary sites. Thus, this bonding is a selective process as in biological and physical systems. The selectivity of bonding sites provides certain error-prevention capability intrinsically and provides a general mechanism for self-assembly of desired structures and execution pathways. Matching bond sites can be thought of as having a virtual attraction, as weak bonds will readily form between them when they become available (by breaking existing bonds).

A natural property of this physics-emulating approach is the availability of concurrent non-deterministic execution pathways that can self-assemble. Here, populations of individual software structures self-assemble individual execution steps in single execution pathways or complex execution networks over time by making and breaking weak bonds with each other. It is possible to completely "wire" together modules into an execution software process using only these flexible (but relatively slow) stochastic processes. Deterministic (faster but inflexible) execution can also be assembled, using structures that are strongly bonded, in which the order of the components in memory determine the execution sequence. The ability to readily mix and modify both sequential deterministic execution processes and dynamic stochastic execution processes provides a novel flexibility to the software self-assembly processes. In fact, the executing self-assembling software alternates between these two mechanisms. Stochastic weak bonding and unbonding events trigger a set of deterministic actions within the associated structures, which in turn lead to more stochastic bond formation and release events.

Newly freed bonding sites become available for bonding with other free sites that have complementary key matches. If no matching sites are available, such sites passively "wait" until matching sites do become available for bond formation. The new bonds can activate dormant structures that contain these sites. In this way, execution pathways become alternately active and dormant, so that the physical order of such software components in memory becomes irrelevant to the execution behavior of the system. Software structures with free sites can act as passive (i.e. non-polling) sensors for detecting complex situations that generate matching bonding sites. This is unlike the conventional conditional branching constructs such as IF and CASE, and is a software analog of hardware interrupts.

A bonding site that is available posts its corresponding key identifier on the software means for listing an available site. A software means for establishing identifier key matching determines if complementary identifier keys are available and posts these keys and associated bonding sites to an event manager. The event manager controls the making (or breaking) of a bond for the software environment and can schedule or sequence events of both making and breaking bonds. For example, some make bond events are required by a problem to have a higher frequency of occurrence than other events. When a bond is made between complementary identifier keys, the appropriate action is performed by the associated submachines and machines. That action can be to wait until further bonds are made or can be the execution of software within the machine.

The hierarchical structure of the self-assembling software is enabled through an encapsulant structure. This is analogous to a cell wall. Encapsulants allow bonds to form only for pairs of sites that are within the same encapsulant. By limiting the population size of machines in any encapsulant, we prevent an $O(N^2)$ escalation of possible site-site interactions and help enforce scalability of the approach to large software systems. The encapsulants manage external interactions with other encapsulants through surface sites. These surface sites are machines, referred to as surface machines or gateway machines, that enable communication through or "transport" in and out of the encapsulant. Encapsulants can contain other encapsulants, allowing a hierarchical structure. Movement of machines and encapsulants in and out of other encapsulants changes the populations of sites that can form bonds within these encapsulants, and so directly modifies the internal software execution.

The software system intentionally resembles a stochastic physics or biology simulation, in that the stochastic bonding and unbonding events are posted to an event manager and assigned a future (virtual, not processor) "time" for execution that is used simply to provide an ordering to event execution. Despite the non-physical nature of software modules, the software modules can be subjected to several physics-emulating processes. Modules can be moved through the encapsulant hierarchy, machine parts can be assembled and eliminated dynamically, and machines and encapsulants can stick together and come apart dynamically. Machine proximity is used here as well, albeit in a graph-theory sense. The bonds between machines form graph edges, which can be used to directly locate "nearby" machines. In some cases, this process can be used to deterministically search for multiple matching sites between machines that have just formed a new weak bond. This allows groups of matching bonding sites on two machines to bond at essentially the same time, so as to behave like a single effective pair of larger scale bonding sites.

Multiple, concurrent threads of self-assembly and associated computation are automatically available in this approach. The virtual event times can be used to provide execution priority to concurrent processes without the involvement of the operating system. Further, additional code for monitoring and querying the existing code can be introduced during execution.

This approach exhibits features that can prove useful for generating large software systems. First, self-assembly reduces the amount of minutia that must be provided by the software developer. The self-assembly processes take over some of the details that must be designed and coded. This can save development time. It can also reduce coding errors. The interactions between modules are self-assembling, and are enforced to generate hierarchical structuring. Second, this approach enables novel programming constructs, e.g. the "situation", the "external override" for software reuse, concurrent "stochastic" reconfigurable execution pathways, and the ability to modify and add monitoring capability to a pre-existing machine as it executes. Third, the bonding selectivity enforces correct interactions between modules and data structures that can allow greater surety of the implementation.

Figure 1:
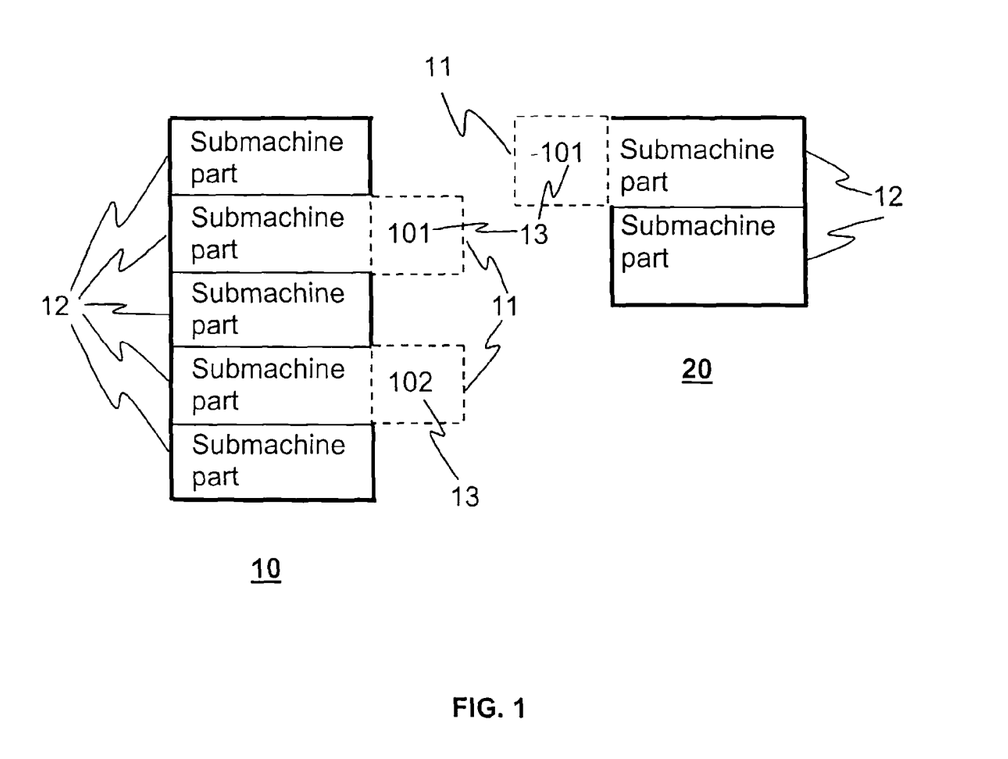
FIG. 1 illustrates two machines of the present invention.

In one embodiment, according to the present invention, a computer system implements a software self-assembly system that comprises at least two machines (see FIG. 1, where machines 10 and 20 are each represented by a polygon for visual representation) that bind (through bonding sites) and form an execution sequence, wherein each machine comprises at least one bonding site 11 and at least one submachine part 12, the submachine part consisting of a component selected from a data storage means, an actuating means and a control means. The computer system can be standard hardware that comprises both input and output means, processing means and storage means, all of which are standard in the art. Each bonding site contains an identifier key 13 which is an identification means for a bonding site associated with a machine or associated with a submachine within the machine. An available key identifier associated with a bonding site that has not bonded to another site is listed with a software means for listing an available bonding site (or equivalently, a software means for listing an available key identifier). When complementary identifier keys are matched by a software means for establishing identifier key matching, the match is posted with an event manager as a make-bond event. In the embodiment depicted in FIG. 1, the complementary identifier keys are represented by the numbers 101 and −101. An actuating means contains execution code that executes upon activation. The actuating means can have multiple bonding sites and can be active or inactive depending upon the bonding status of the sites. An inactive actuating means can halt execution of a machine with execution resuming when the necessary activating bonds are in place. The code executed by the actuating means is typically the lowest level functionality that a computer programming language provides. Software complexity as implemented in a hierarchical software system thus arises from the assembly of the submachine parts into machines and the self-assembly of the machines, with their execution sequences, within encapsulants, and the subsequent hierarchical assembly and interaction of encapsulant execution structures. A control means provides a single bonding site and can be active or passive. An active control means must have its single site bonded with a site on another machine for the machine to become active and execute the code in the actuating means. A passive control means has a bonding site that does not activate the machine but is useful for other machines that must dock to or manipulate the machine. A data storage means has the features of a simple control means and can point to a block of memory used for data storage. The data-associated site keys of data stores can be used to enforce the correct transfer and usage of complex data structures. The present invention also comprises an information manager which translates external stimulus into a key change of existing machines, data passed to existing machines bound to the information manager, or a machine with associated submachines, bonding sites, and key identifiers that can be introduced into the software information to interact with other machines. The information manager can be a user of the software who changes a key, passes data, or constructs a machine based on the external stimulus or the information manager can be software that translates the external stimulus into a machine, key change, or other instruction. The event manager, means for establishing identifier key matching and means for listing an available bonding site of the present invention are standard software constructs used in current software architecture. Other standard software constructs, including but not limited to sorting, input and output constructs, can be utilized in the software architecture of the present invention. The information manager translates events from the computer input means (such as a mouse, keyboard, network message, or voice-activated input means) into one or more new machines, one or more key changes of existing machines, or data passed to machines bound to the information manager. The software machines comprise data storage means as well as bonding sites with associated key identifiers, actuating means and control means. The information associated with these machines can be transmitted to an output device of the computer system to be displayed to a user by any standard output means, including graphical displays and hardcopy output. The output means obtains information from at least one of the machines, such as results from executed code that is stored in the data storage means, and outputs the information to a user. Other information that can be transmitted to a user using the output means include information input to the machines (e.g. external stimulus), a history of the bonding events, and complementary identifier keys.

Both control means and actuating means are described by generic design data and execution code (analogous to a class definition in object oriented programming). One aspect of this design is whether the submachine makes bonds stochastically (by finding a match on the free-site list) or deterministically (through proximity). Individual versions of these parts are instantiated into particular machines when these machines are created.

Figure 2:
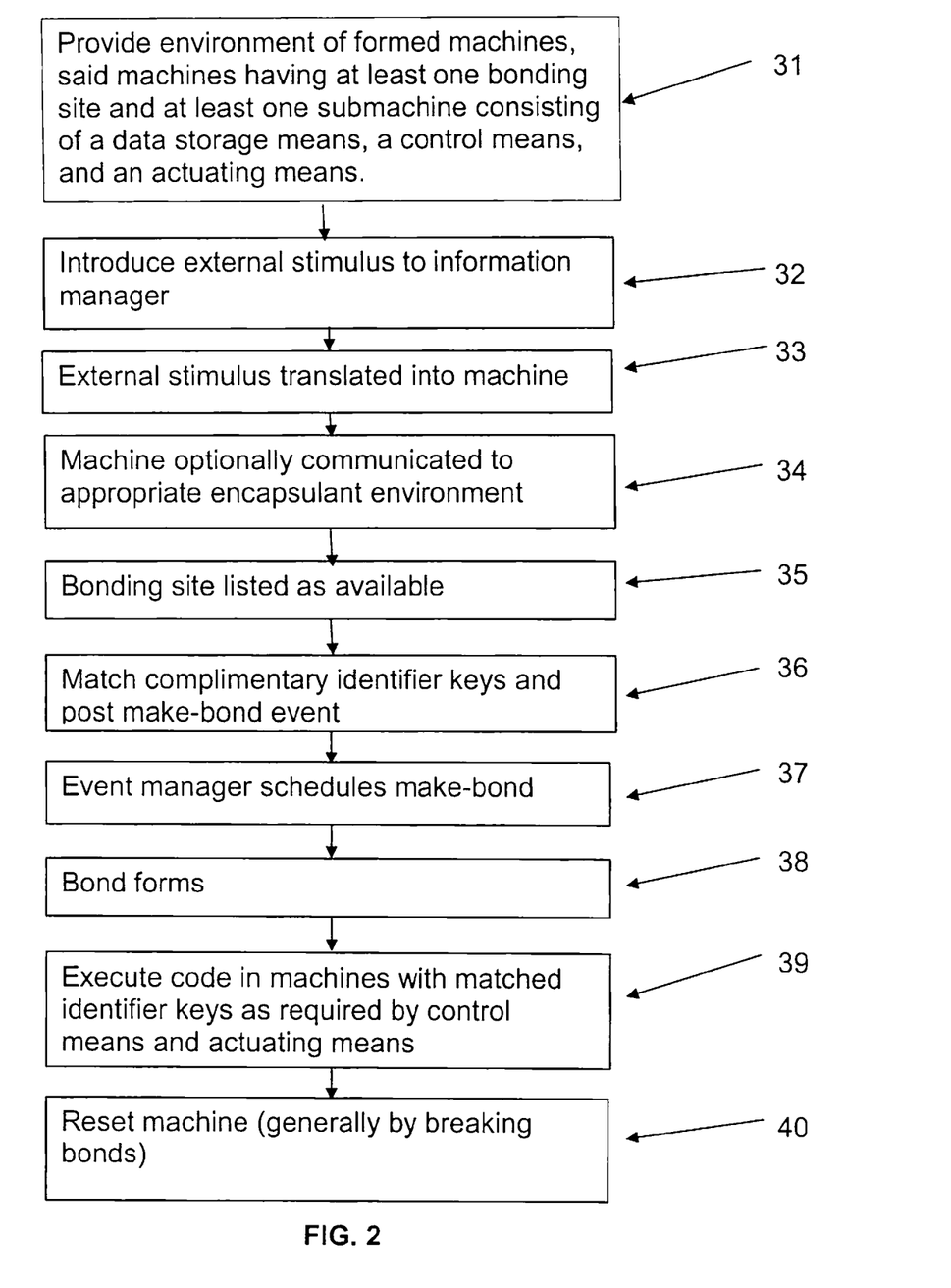
FIG. 2 illustrates the self-assembly method of the present invention.

Using the software system of the present invention, a function can be performed through software execution according to the software system elements as described. In one embodiment, as depicted in the flow chart in FIG. 2, a set of machines is constructed to perform an application. The set of machines constructed 31 can be a single machine, multiple unencapsulated machines, multiple machines within an encapsulated environment, multiple encapsulants or multiple nested encapsulants. An external stimulus is introduced 32 to an information manager. For example, this external stimulus can be a piece of information that must be processed or a sequence of executable instructions. The information manager translates or instantiates 33 the information into a machine (or key changes, or signal passed to bound machines), such as into a first machine as a data storage means with a bonding site and an assigned identifier key consistent with the nature of the information. The information manager optionally directs 34 the machine appropriately to the encapsulant environment consistent with the nature of the information or optionally assigns the machine an identifier key that is the complementary identifier key to a gate machine's identifier key that must be matched to allow access to an encapsulant environment. The machine's bonding site (or alternatively the key identifier) is listed 35 as available by the means for listing an available bonding site. At least one other machine designed to perform a particular function with the information exists in the encapsulant environment with the second machine typically having control means and actuating means. For the machines to self-assemble, the first machine and a second machine must have complementary identifier keys. The means for matching identifier keys establishes 36 that complementary identifier keys are present and posts a make-bond event to the event manager. The event manager schedules 37 the making of the bond according to parameters defined within one or more of the submachines or machines associated with the make-bond event. The bond subsequently forms 38 between the two complementary identifier key bonding sites and the two machines have thus self-assembled. Optionally, other machines can be present that have bonding sites that can self-assemble with any of the other available machines. When all of the bonds necessary to activate the actuating means have been made, the control means activates the actuating means of one or all of the self-assembled machines and the designated code is executed 39. When a machine's actuating means have completed their execution, the machine is typically reset 40, meaning the bonds causing the execution are broken through the event manager and the bonding sites can then be accessed again by the means for listing available bonding sites. Alternatively, none of the bonding sites need have the bond broken, only part of the bonding sites can be freed, or any subset of bonds can be maintained either for a specific time period or until another actuating event occurs at the machine. When a matching site is found by the means for matching identifier keys, an event is again posted to the event manager so that a bond can again be made between the bonding sites with the complementary identifier keys. If no match is available, the free bonding site is listed as available. Optionally means can be provided for ordering the available bonding sites and the identifier keys. Output means can optionally be invoked to output results from the self-assembled machines to standard output software modules and formats.

Figure 3:
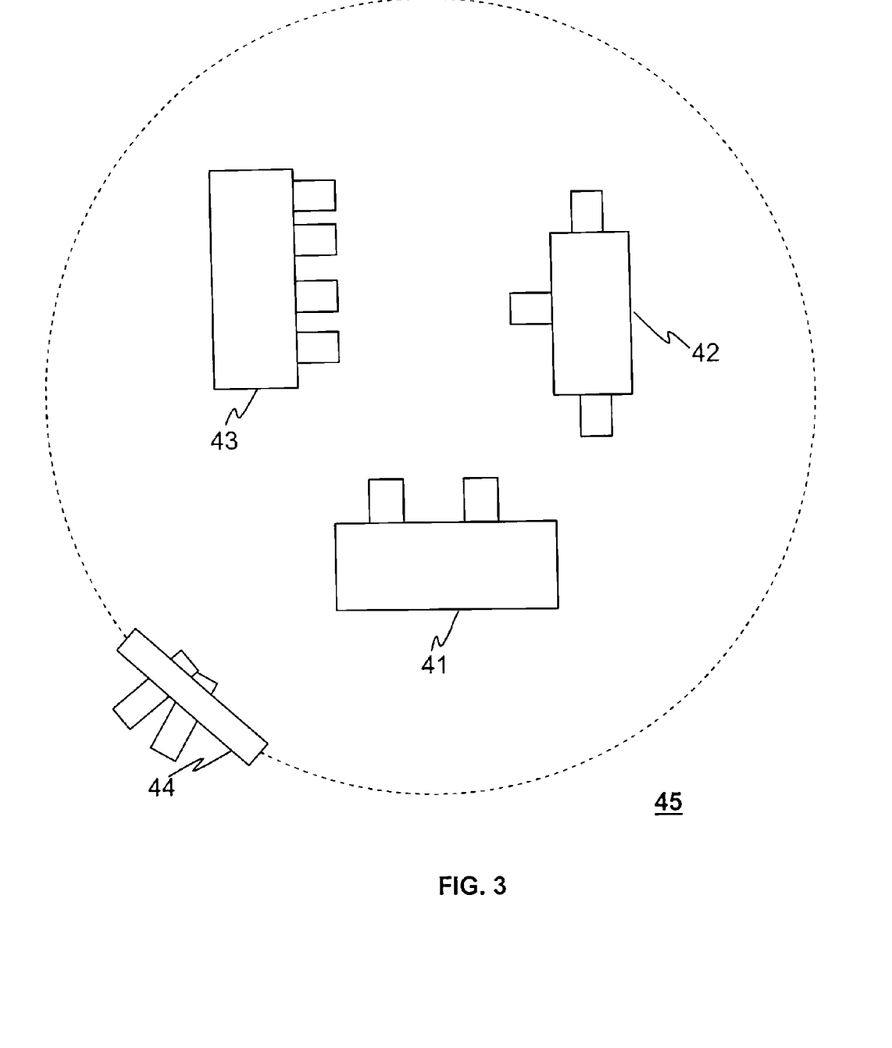
FIG. 3 illustrates an encapsulant environment.

Such a system of machines can be situated in a virtual environment referred to as an encapsulant (see FIG. 3 for an illustration of one embodiment) where the encapsulant performs some application, function or process. The encapsulant 45 of FIG. 3 illustrates an environment containing 3 machines 41, 42, and 43, and includes a fourth (surface) machine, 44, which acts as a gate to allow machines to enter or exit. This surface or gateway machine has a key identifier associated with a bonding site; a machine must have a complementary key identifier to pass through the virtual encapsulant surface. A machine can either pass from external to the encapsulant to inside the encapsulant or from internal to the encapsulant to the external environment. The protrusions depicted on the polygon-shaped machines are potential bonding sites. Encapsulants effectively create local environments in which collections of free bond sites can interact to form new bonds. Encapsulants resemble biological cell walls that isolate their internal contents from bonding interactions with external structures. Encapsulants can contain machines as well as other encapsulants (for hierarchical organization). They also contain "surface" machines that manage all external interactions of the encapsulant, and allow it to act as a machine building block for structures and execution pathways at another (higher) hierarchy level. The encapsulant surface machines are analogous to membrane proteins in biological cells. Some surface machines, termed gates, correspond to channel proteins, allowing passage of other entities (machines or encapsulants) into or out of the encapsulant. Others correspond to membrane-bound signal or receptor proteins in biological cells, where interactions between a signal in the surface of one encapsulant and a receptor in the surface of another results in internal responses within one or both encapsulants, without transporting anything into or out of either encapsulant. The encapsulants provide modularity and information hiding. In contrast to object modules, the contents of encapsulants are dynamic, with machines (containing data and executable code) and other encapsulants (containing machines with data and executable code) being moved in and out during self-assembly and software execution.

The event manager, the means for establishing identifier key matching and the means for listing an available bonding site are typically part of the software infrastructure and outside the encapsulant environment. However, these elements could be within the encapsulant environment if desired and could, in fact, be encapsulants themselves formed by self-assembled machines according to the present invention.

Figure 4:
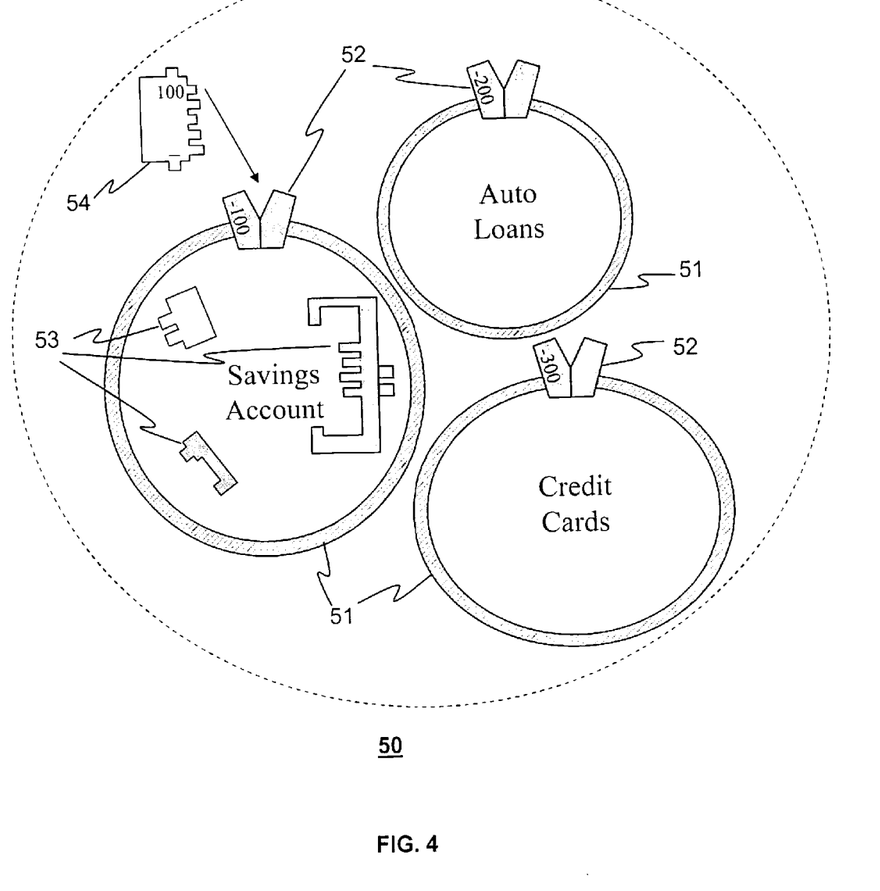
FIG. 4 illustrates a hierarchical software self-assembly environment with multiple encapsulants.

FIG. 4 illustrates a hierarchical software system 50 according to the present invention where multiple encapsulants are present. Each encapsulant 51 has at least one surface machine 52 on its surface with at least one specific identifier key. The surface machine functions as a gate for controlling passage through the encapsulant. The surface machine can also function to allow communication through the virtual encapsulant environment from a machine external to the environment to a machine internal to the environment (or, alternatively, from internal to external to the environment). The gate machine 52 can have the same identifier key for passage external to internal to the encapsulant as well as internal to external to the encapsulant or can have two or more identifier keys. Each encapsulant can have multiple machines within the encapsulant environment, as depicted by the three machines 53 within the Savings Account encapsulant. In this embodiment, complementary identifier keys are those having the same absolute numerical value identifier but with one of the numerical values negative (such as 100 and −100). The Withdrawal machine 54 will only enter the Savings Account encapsulant because only the Savings Account has a surface machine with an identifier key, −100, that is the complementary match the Withdrawal machine's key, 100. Similarly, auto loan payment machines could be constructed to only pass into the Auto Loan encapsulant. Additionally, the surface machine on one encapsulant can bond with a surface machine on another encapsulant or a machine in the external environment with an available bonding site. This bonding event can trigger a sequence of bonding events and actuation within the encapsulant. Thus, interactions of surface machines of the encapsulant can enable dynamic behavior within it, even without transporting any other machines or encapsulants inside of it.

The overall action of the system is to execute make-bond and break-bond events, and these then trigger the activation or deactivation of associated machines that can carry out deterministic behaviors. This system is thus event-driven, with the events consisting of stochastic or deterministic bond formation and bond breaking. The event manager maintains an event queue to efficiently post future events and to execute the events in some, usually chronological, order. Free bonding sites are generally posted to a data structure, with sites arranged according to their site keys so that matching site pairs can be efficiently found by the identifier matching means. Bond formation triggers the execution of the machine(s) that contain the sites. Machines become active when the necessary control means have bonds. The machine actuating means can execute their code in the sequence that they occur in the machine if their sites are in the necessary bonding configuration. Execution stops at an actuator site that is not "ready" to execute. Each machine maintains its own "instruction pointer" to enable restart of the machine execution at the proper part when bonding conditions change externally to allow restart.

The code executed by the actuating means is typically the lowest level functionality that a computer programming language would provide. The complexity of the overall software comes from: the assembly of parts into machines; the stochastic assembly of machine execution sequences within encapsulants; and the hierarchical assembly and interaction of encapsulant execution structures. The system requires a computer language for implementation. In one embodiment, the computer language FORTH is utilized to implement the self-assembling software system. FORTH essentially lacks conventional language syntax; thus, the self-assembled software can execute without concern for syntax errors or keyword use restriction. FORTH permits the entry of executable code directly and allows code definitions to be deferred and redefined later. This allows the software to directly modify itself while running without the offline compilation step that would be required by a compiled language.

The self-assembling software system of the present invention provides additional constructs useful in software systems. In one embodiment, constructs of machines are formed. "Situations" are a generalization of the IF branching construct. Situations provide a mechanism for "sensing" whenever certain conditions or events occur by providing passive machines with free bonding sites. These bonding sites correspond to the conditions of interest, and when all bonds are satisfied, the sensing machine is activated to report or trigger a desired response. Situation detection is asynchronous. It is also passive, in that no repeated active polling by the machine itself is required to detect the events. Situations can monitor the code structure itself. For example, the activity of other machines, their status (number of bonded and unbonded sites, active or dormant), their functionality, and the numbers and types of machines present in an encapsulant can all be determined automatically.

In another embodiment, one or more machines form an external override. External overrides are a useful and novel construct. The term "external" indicates that the code designer does not alter or remove the original source software that is being overridden. There are a variety of ways that the self-assembling software system can carry out external overrides, and they can be carried out at the encapsulant level or at the machine level. In all cases, additional generic override machines are introduced into the system (even to remove existing functionality). At the encapsulant level, existing machines can be skipped, made to wait for new conditions (not present in the original design), or to take part in alternative stochastic execution pathways not present originally. At the machine level, modified clones of the original machines can be self-assembled. These external overrides can be introduced into existing self-assembling software in "real-time" while the existing software is being executed. An information manager can be provided that translates events from a computer input means into at least one key change of at least one machine such that the self-assembly of the machines and the execution sequence is altered. The information manager can also generate a machine that causes the key change or pass data to an existing machine bound to the information manager to cause the key change.

In another embodiment, monitoring and querying of self-assembling and executing software during runtime can be implemented using the machines of the present invention. These are special cases of the override and situation processes. These processes can be developed long after the software of interest has self-assembled. Monitoring can be accomplished by inserting machines that act as sensors into the stochastic execution pathway during execution and having them report on activity or on the data that are being manipulated. The functionality of the monitored machines is not affected during monitoring. However, the total execution time will clearly be altered by this monitoring process.

In another embodiment, at least one machine can be used to establish runtime priority. Runtime priority can be modified for various concurrent self-assembly processes. Processor allocation is often implemented at the operating system level. It is easy to allocate different amounts of processing time to concurrent processes here by varying the future (virtual) event times associated with each process. Those with short times will repeatedly activate more frequently.

The actuating means are the submachine parts that perform software functions most programmers expect, such as reading or writing data, or performing calculations or otherwise manipulating data. An actuating means can also change the keys of its own machine's sites, or those of the machine it is bonded to. When a machine is reset, its stochastically bonding sites are matched against the free sites. If the machine's actuating means changed some of its site's identifier keys, it can bond to a different machine, resulting in the execution of a different software function than if the actuating means had changed the site's keys in some other way. Thus, actuating means can influence the execution pathway of the self-assembled software.

If the event pulled from the event manager was a break event, the bond between the two specified sites is broken (for example, their "site-bonded-to" pointers are set to 0). Each site's break-bond event handler is executed. These event handlers typically update the active state of the part (to set it inactive) and can also result in changing the key of the same site or some other bonding site on the same machine. Typically, breaking bonds does not result in activating the actuating means.

When the make- or break-bond processing is completed, the next event is pulled from the event manager, and the process is repeated until there are no more events associated with the event manager. Alternatively, a "pause" event can be placed with the event manager to temporarily pause execution. Such an event can be used, for example, to update a Windows display or output to a file at regular intervals.

In another embodiment, the system can implement a simple but general mechanism for overrides via machines that modify the keys of other machines. Altering a key to an unusual or "invalid" value prevents the associated site from forming any bonds. This allows bonding to be turned on and off externally. Altering keys also allows stochastic execution pathways to be altered. Machines can be added or removed from an execution path through the generation of "glue" machines that manage the key alterations. The appropriate sites for modification can be found by the machines themselves, so that human designer intervention can be at a high level. Sequential stochastic execution pathways can be implemented among machines in multiple ways. One method is to introduce a signal machine that bonds to a corresponding control site on the machines of interest. A sequencing machine can alter the key of this signal machine so that it triggers a series of machines to act in the desired order. Multiple pathways can be spawned by generating multiple signal machines at the same time.

A more direct method is to have an "output" site on one machine match an enabling control site on a second machine that is to execute after the first machine. The first machine site can hide its output site (the site key made an invalid value) until it is finished executing, then it can restore the necessary output site key.

Another way to implement sequential stochastic execution pathways is to have the output site on one machine match one site of a signaling machine. The first machine hides its output site (the site key made an invalid value) until its actuation is completed. Then it sets the necessary output site key. When the signaling machine bonds and then breaks from the first machine's output site, the signaling machine identifier toggles to a different value, one which matches the enabling control on a second machine that is to execute after the first machine. When the signaling machine bonds and then breaks from the enabling site on the second machine, its identifier toggles back to the original value, and is listed among the available keys, so that it is ready to bond to the output site of the first machine again whenever it becomes available. Thus the toggling sites of the signaling machine act as a dynamic "wire" between the two executing machines.

The self-assembled software system of the present invention can cause self-assembling software to create data structures and behaviors that conform to the software designer's requirements. There are a variety of potential mechanisms for accomplishing this. The simplest is to start with initial conditions, that is, initial sets of machines, that are already known to self-assemble in ways that lead to desired types of results. One can design and verify that particular populations of machines will carry out frequently needed behaviors, and then create machine clone populations in an encapsulant with a single high level command word. Further, machines can be designed that implement common types of overriding modifications in the self-assembly process, and these override machine populations can similarly be introduced into existing encapsulants by high level words. By combining these high level constructs, more complex behaviors can be assembled. Further, hierarchical structuring can be enforced by limiting the population size in any encapsulant, and automatically triggering the creation of additional encapsulants as machine population sizes exceed selected limits. Additionally, time-dependent steering can be provided by adding or taking away machines or by suppressing or overriding existing machines (again using high level words) at various times as self-assembly progresses. This breaks up the development into well defined stages.

In another embodiment, a computer system is provided, comprising, a processor; and a data storage unit coupled to said processor, the data storage unit storing instructions that, if executed by the processor, will cause the processor to perform the operations including providing a computer-implemented system of self-assembling software, comprising at least two machines with bonding sites with complementary identifier keys, that bind and form an execution sequence; providing an information manager, wherein said information manager translates events from a computer input means into at least one key change of at least one machine such that the self-assembly of machines and the execution sequence is altered; and displaying to a user by output means information from at least one of said machines.

EXAMPLES

Example 1

Two Simple Machines Self-Assemble

In the simplest self-assembly of two machines, a single machine, machine A, exists or is constructed that is designed to process some information. An information manager translates an external stimulus into another machine, machine B, with appropriate submachines and key identifiers. For example, the external stimulus can be data that needs to be processed or executable instructions. If the information is data, the information manager translates the data into a machine with a data storage submachine component and at least one key identifier that is consistent with the characteristics of the data. Alternatively, the information could be translated into a machine with control means or actuator means submachine components. The key identifier or key identifiers are listed with the means for listing available bonding sites, and the means for matching key identifiers determines if one of the available bonding sites has a key identifier that is complementary to the key identifier of the introduced machine. If so, a make-bond event is posted to the event manager which schedules the make-bond event. Subsequently, a bond is formed and the two machines, A and B, have self-assembled. If the control means determines that all of the bonds necessary to perform its designated function have formed, it activates the actuating means which executes the designated code sequences. Alternatively, additional bonds can be required before the designated code sequences are executed.

Example 2

Multiple Machines Self-Assemble

The same elements and steps of self-assembly as in Example 1, with at least one additional machine existing. Multiple external stimuli can be introduced and translated into one or more machines. In this embodiment, one machine, designated as machine A, requires multiple bonds to form before designated code sequences are executed in machine A. The multiple bonds can form with a single other machine that has multiple bonding sites or with multiple other machines, each with one or more bonding sites.

Example 3

Machine Introduced into an Encapsulant Environment

This embodiment has the same elements and steps of self-assembly as in Example 1 but with the machine B formed by the information manager has a bonding site and key identifier to allow entrance into an encapsulant environment. In this embodiment, the encapsulant environment has a surface or gateway machine with a bonding site with a key identifier designated, for example, as 100. Only machines with a complementary key identifier of −100 can bond with this surface machine and gain entrance into the encapsulant environment. Machine B has a complementary key identifier of −100 associated with a bonding site assigned by the information manager; alternatively, the machine B could be previously formed with the complementary key identifier of −100. Machine B has its bonding site with associated key identifier of −100 posted with the means for listing key identifier, the means for matching identifiers matches this key identifier with the complementary key identifier associated with the surface machine, a make-bond event is posted with the event manager and ultimately a bond is formed that results in the machine B entering the encapsulant environment where it can interact with the machines existing in that environment.

Example 4

Surface Machine has Multiple Bonding Sites

The elements and steps of Example 3, where the surface machine has one bonding site and associated key identifier that allows entrance from external to the encapsulant environment to internal to the environment and another bonding site and associated key identifier that allows exit of a machine from internal to the encapsulant environment to external to the encapsulant environment.

Example 5

Machine Reset after Execution

In this embodiment, the method of Example 1 has the additional step of resetting one or both of the machines involved in the self-assembly process. The machine or machines can be reset by simply breaking the bonds, wherein the break-bond event can be posted to the event manager to control the schedule of the event, and maintaining the same identifier keys. Alternatively, the bonds can be broken and one or more identifier keys can be set to alternative values that could allow the machine to bond elsewhere to another machine. The bonds can be maintained for a specified time period or until another designated event occurs before being reset.

Example 6

Bank Transaction

In one embodiment, an example of the handling of savings account withdrawals was performed to demonstrate a simple embodiment of the concepts and infrastructure of the self-assembled software of the present invention. The machines are represented graphically by polygon shapes. For example, one machine is designated the Withdrawal Manager 61 (see FIG. 5). The bonding sites 62 and identifier key values (listed as positive and negative numerals on each bonding site) depicted as tabs at the perimeter of the machine. The internal parts (such as data storage means, actuating means and control means) are omitted for clarity. When the sites of two machines touch, a weak bond can form if complementary identifier keys exist on the two machines.

Figure 5:
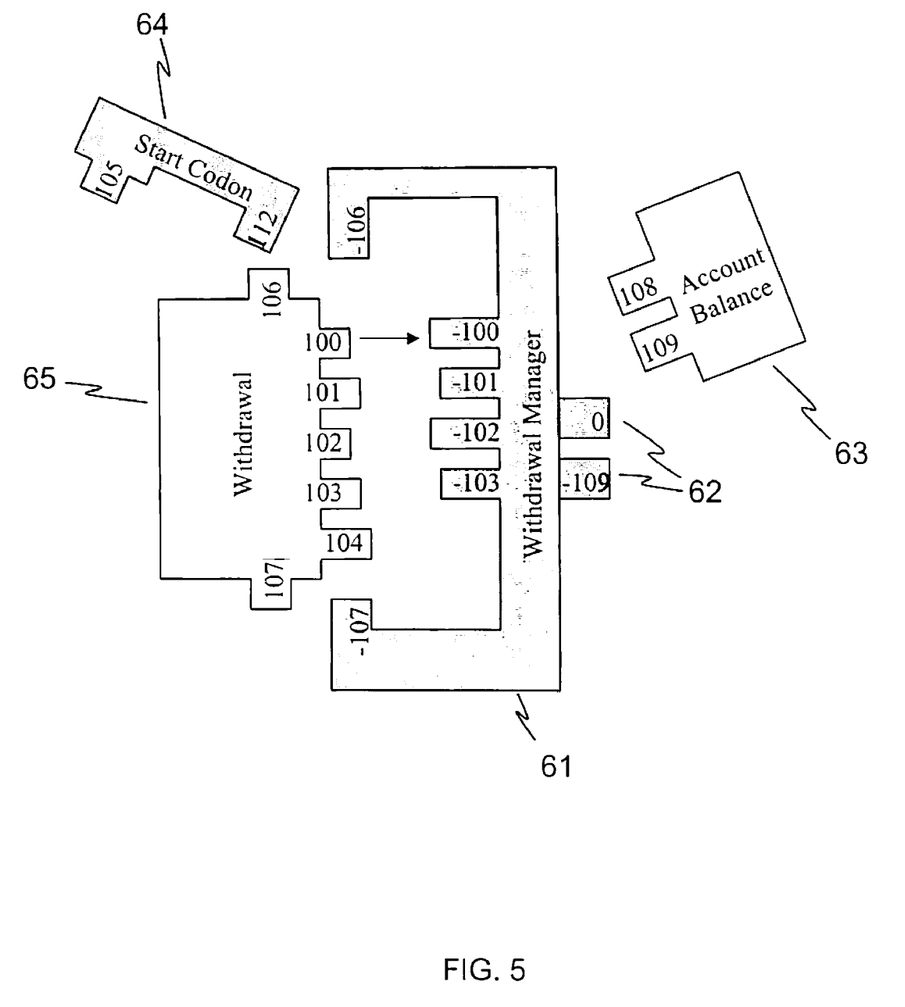
FIG. 5 illustrates multiple machines preparing for software assembly according to the present invention.

In FIG. 5, four machines are present, a machine referred to as the Account Balance 63, a machine referred to as the Withdrawal Manager 61, a machine referred to as the Start Codon 64, and a machine referred to as the Withdrawal 65. The Withdrawal machine 65 is the result of an external stimulus, a money withdrawal, that was introduced into an information manager that translated the external stimulus into the machine. The Account Balance machine 63 holds the current balance for the account in a data store, the Withdrawal Manager machine 61 subtracts the withdrawal amount from the current balance and updates the current balance. The Start Codon machine 65 acts as the "head" of a "polymer" of completed transactions, which can be walked later by another machine, for example, a Monthly Account Report machine (not depicted). All of their stochastically bonding sites are posted on the means for listing available bonding sites (not depicted).

Figure 6:
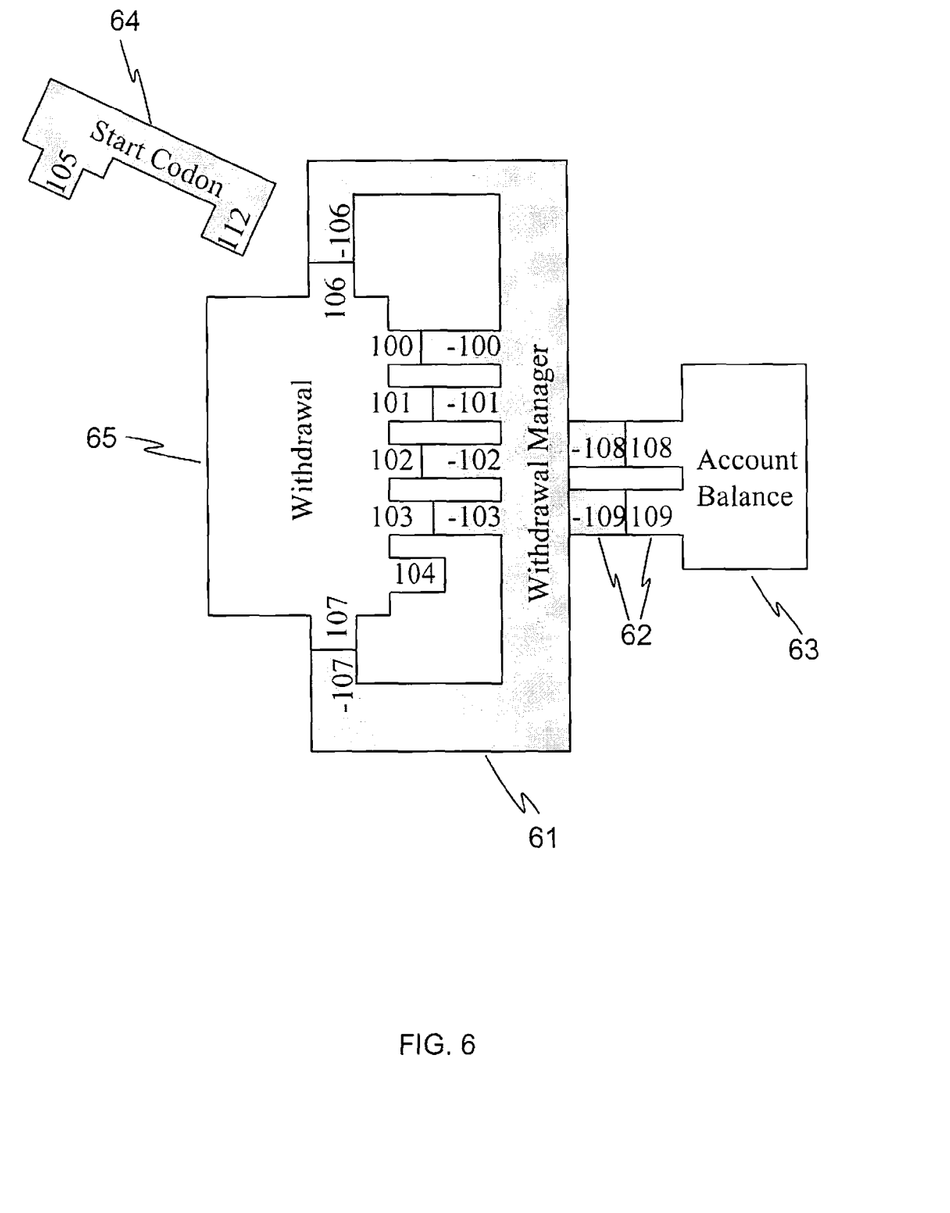
FIG. 6 illustrates self-assembly of three machines.
Figure 7:
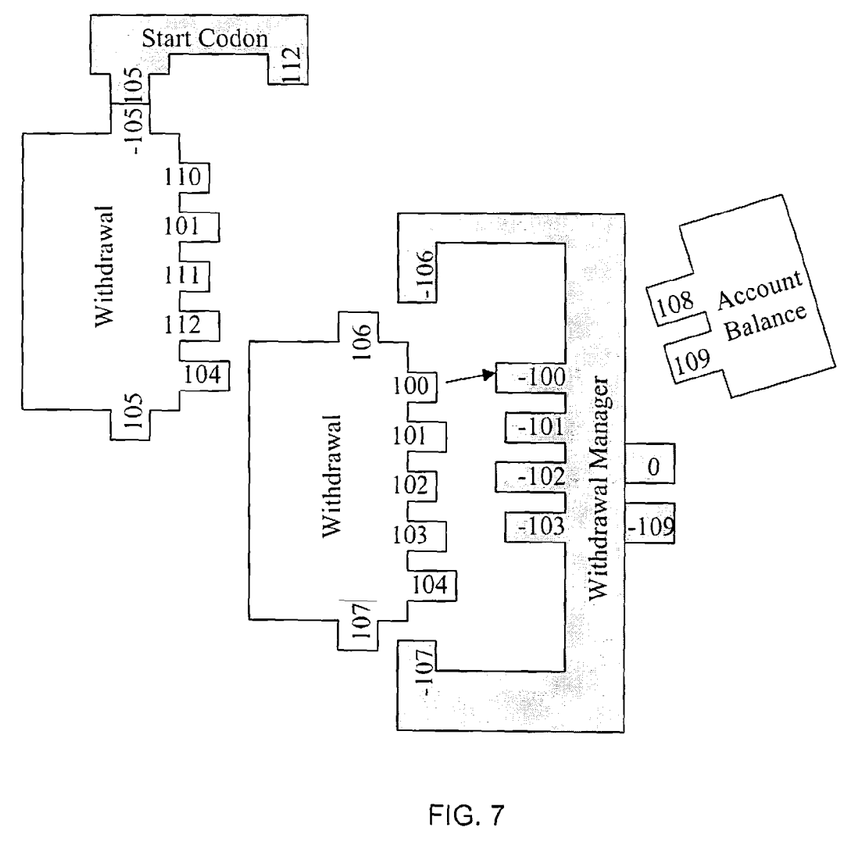
FIG. 7 depicts resetting of identifier keys after execution of code sequence.

When an actual bank account withdrawal occurs, a machine referred to in this example as a Withdrawal machine 65 is formed. The identifier key matching means matches keys of the Withdrawal machine 65 to those of the Withdrawal Manager 61 and posts make-bond events to the event manager means. When these make-bond events are handled, the Withdrawal Manager's 61 actuating means activate, changing its site with an identifier key of 0 to −108. The −108 site now bonds with the complementary site on the Account Balance machine 63 (see FIG. 6), where the complementary sites have identifier keys that are designated as complementary by having the same absolute numerical value but of opposite sign. Additional actuating means in the Withdrawal Manager machine 61 then activate, subtracting the withdrawal amount (in a data store of the Withdrawal machine 65) from the current balance (in a data store of the Account Balance machine 63), and saving the result back to the Account Balance machine 63. The Withdrawal Manager machine 61 then changes (see FIG. 7) several keys of the Withdrawal machine 65 (for example, the key identifiers designated as 100, 102, 103, 106 and 107 are changed to 110, 111, 112, 105, and 105, respectively), so that (1) it will not bond again to the Withdrawal Manager machine 61 (which would result in subtracting the same withdrawal again) and (2) it will bond to the Start Codon machine 64 and leave a 105 site available for the next Withdrawal machine 65 to bond to. Lastly, the Withdrawal Manager machine 61 sets its −108 key back to 0 and resets. Now it is ready for another withdrawal action. Note that the Withdrawal Manager machine 61 changes its site keys to bond to the Account Balance machine 63 only temporarily. This leaves the Account Balance machine 63 free to bond to other machines (such as a Deposit Manager or Interest Compounder, not depicted) when needed.

Example 7

Bank Transaction Preventing Overdraft of Account

After executing the code described in Example 6, in this embodiment modifications to the software system are required after realization that a requirement was omitted: the system needs to prevent the withdrawal of an amount exceeding the current balance. To accommodate this requirement, an external override is implemented. In essence, a machine inserts itself into the execution pathway before the Withdrawal Manager to check whether there are sufficient funds to complete the transaction. In one embodiment, an external stimulus representing the additional requirement or override is introduced into the information manager, which translates the external stimulus into a machine (designated herein as the Verify Withdrawal machine) with appropriate submachine or submachines and bonding sites with key identifiers.

Figure 8:
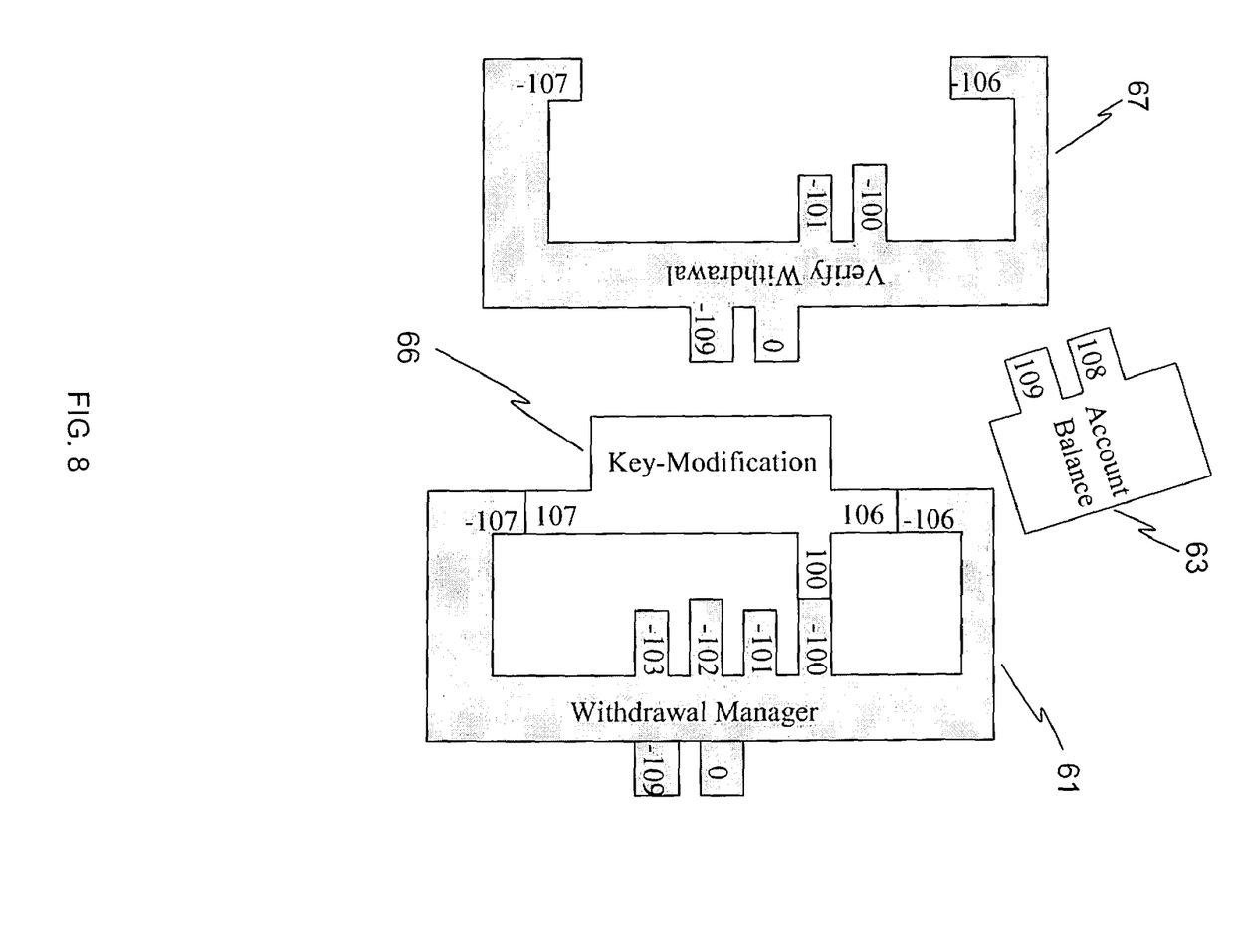
FIG. 8 depicts the introduction of a Key-Modification machine in one embodiment to modify a machine's identifier keys.

A Key-Modification machine 66 (FIG. 8) modifies some of the keys of the Withdrawal Manager 61 so that Withdrawals will no longer automatically bond with it. Only the 100, 106, and 107 sites of the Withdrawal machine 65 make bonds stochastically. Therefore only −100, −106, and −107 of the Withdrawal Manager machine 61 need to be changed. Once the Key-Modification machine 66 has done its job, it sets all of its own keys to 0.

Figure 9:
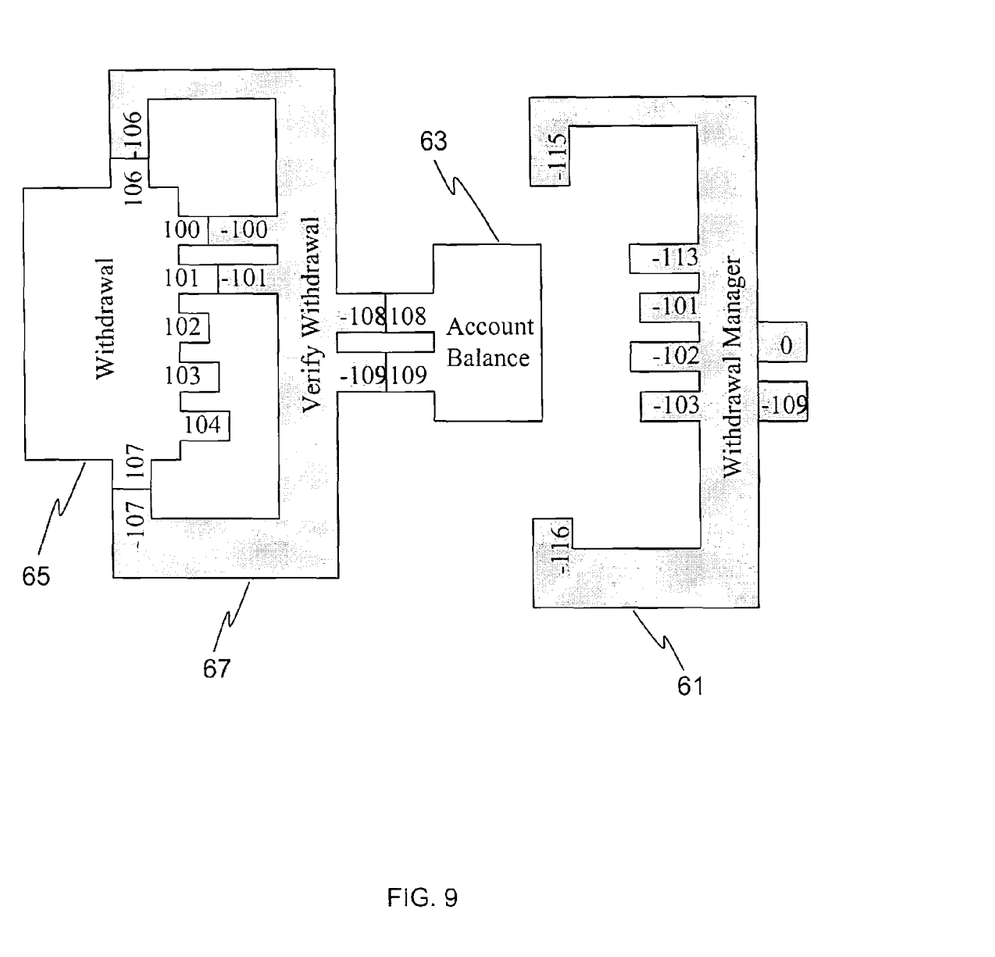
FIG. 9 depicts bonding of one machine to another machine with new key identifiers.

When the Verify Withdrawal machine 67 inserts itself, its key identifiers are posted to the free-site list of the means to determine available bond sites. Now, when a Withdrawal machine 65 action occurs, it occurs by bonding with the Verify Withdrawal machine 67 instead of the Withdrawal Manager machine 61 (FIG. 9).

Figure 10:
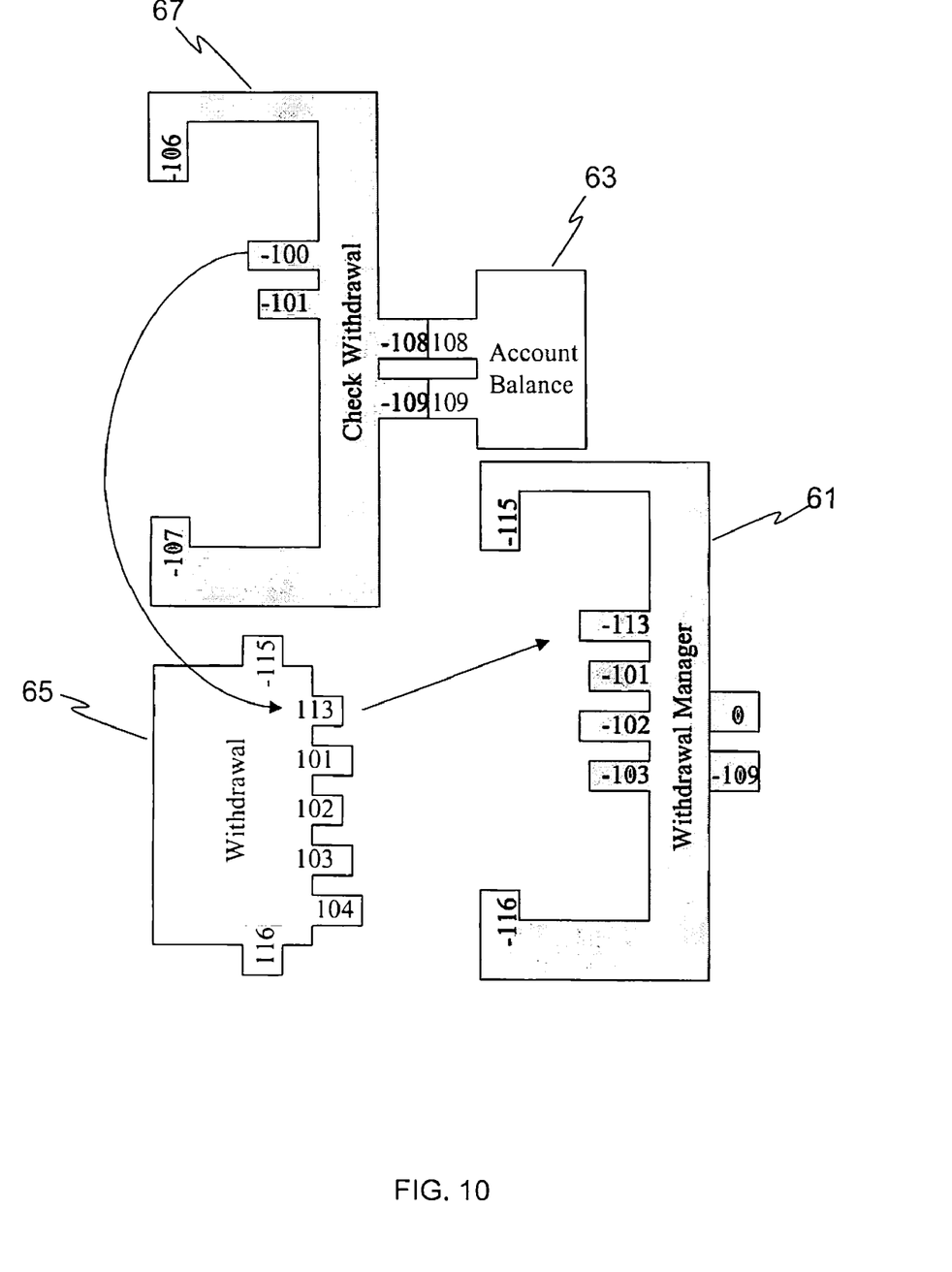
FIG. 10 depicts changing of an identifier key to allow bonding of a machine with another machine.

The Verify Withdrawal machine 67 actuators compare the withdrawal amount to the account balance. If there are sufficient funds for the withdrawal, the Verify Withdrawal machine 67 changes the key identifiers (keys) of the Withdrawal 65 (FIG. 10) enabling bonding with the Withdrawal Manager machine 61, and the transaction proceeds. If there are insufficient funds, the Verify Withdrawal machine 67 changes the key identifiers of the Withdrawal machine 65 to some other values, resulting in bonding with an Insufficient Funds machine instead (not depicted).

Note that with this dynamic self-assembly approach, this new function was inserted into the existing program without (a) rewriting the original source code, (b) compiling an entire new program, or (c) shutting down the already running software.

Finally, when the Savings Account software module is completed, it is encapsulated. Other banking functions are also encapsulated (FIG. 4). Each encapsulant has a Gate machine embedded in its surface, which selectively allows machines to enter, based on matching keys. In the overall banking system, when a Withdrawal occurs, its key matches only the Gate of the Savings Account module, so it enters and undergoes the same process described above.

The invention being thus described, it will be obvious that the same can be varied in many ways. Such variations are not to be regarded as a departure from the spirit and scope of the invention, and all such modifications as would be obvious to one skilled in the art are intended to be included within the scope of the following claims.

We claim:

1. A computer-implemented method for altering code execution in a self-assembling software system, comprising:
   providing a computer-implemented system of self-assembling software including:
      a first machine executing in a computer system, the first machine having a first bonding site including a first identifier key; and
      a second machine executing in the computer system, the second machine having a second bonding site including a second identifier key,
   wherein the first machine and the second machine self-assemble with one another after generation and during runtime execution of both the first machine and the second machine, wherein an execution sequence of the system of self-assembling software is formed at least in part by the first bonding site bonding to the second bonding site;
   providing an information manager to translate an event from a computer input means into at least one key change after the first machine and the second machine self-assemble, the at least one key change to change a value of one of the first identifier key and the second identifier key to alter the execution sequence during runtime execution of a system of self-assembled software, wherein the execution sequence is altered to add functionality to monitor the runtime execution of the system of self-assembled software; and
   displaying to a user by output means information from at least one of said machines,
   wherein, before the first machine and the second machine self-assemble with one another, the first machine and the second machine each dynamically enter a first encapsulant during runtime execution of the system of self-assembling software, wherein the first encapsulant allows bonds to form only for pairs of bonding sites that are in the first encapsulant.

2. The computer-implemented method of claim 1 wherein the information manager to pass data to a machine bound to the information manager to cause the at least one key change.

3. The computer-implemented method of claim 1 wherein the information manager to generate a machine to cause the at least one key change.

4. The computer-implemented method of claim 3 wherein the generated machine is an external override machine having a bonding site with an identifier key complementary to at least one identifier key of a machine in said system of self-assembling software, said external override machine to bond to said machine in said system of self-assembling software, said external override machine to alter code execution of said self-assembling software system.

5. The computer-implemented method of claim 1 wherein the at least one key change to change an identifier key to a value complementary to another identifier key in said self-assembling software system.

6. The computer-implemented method of claim 1, wherein an indication of the first bonding site and an indication of the second bonding site are added, based on the first machine and the second machine entering the first encapsulant, to a list of sites which are available for bonding; and
   wherein, based on self-assembly of the first machine and the second machine with one another, the indication of the first bonding site and the indication of the second bonding site are both removed from a list of sites which are available for bonding.

7. The computer-implemented method of claim 6, wherein, based on the at least one key change, an indication of one of the first bonding site and the second bonding site is added to the list of sites which are available for bonding.

8. The computer-implemented method of claim 1, wherein the system of self-assembling software includes a hierarchy of encapsulants including the first encapsulant.

9. A computer-implemented method for monitoring code execution in a self-assembling software system, comprising:
 inserting a monitoring machine into a computer-implemented system of self-assembling software, said self-assembling software including:
  a first machine having a first bonding site including a first identifier key; and
  a second machine having a second bonding site including a second identifier key, wherein the first machine and the second machine self-assemble with one another after generation and during runtime execution of both the first machine and the second machine,
 wherein an execution sequence of the system of self-assembling software is formed at least in part by the first bonding site bonding to the second bonding site, said monitoring machine having a third bonding site with a third identifier key complementary to an identifier key of one of the machines in said system of self-assembling software, wherein, after the first machine and the second machine self-assemble, said monitoring machine bonds to said one of the machines in said system of self-assembling software and changes a value of an identifier key of a bonding site to alter the execution sequence during runtime execution of the system of self-assembled software, wherein the execution sequence is altered to add functionality to monitor the runtime execution;
 said monitoring machine querying a status of the one of the machines in said system of self-assembling software; and
 said monitoring machine communicating said status to an output device,
 wherein, before the first machine and the second machine self-assemble with one another, the first machine and the second machine each dynamically enter a first encapsulant during runtime execution of the system of self-assembling software, wherein the first encapsulant allows bonds to form only for pairs of bonding sites that are in the first encapsulant, and wherein an indication of the first bonding site and an indication of the second bonding site are added, based on the first machine and the second machine entering the first encapsulant, to a list of sites which are available for bonding.

10. The method of claim 9 wherein said monitoring machine is provided by an information manager that translates an external stimulus into said monitoring machine.

11. The method of claim 9 wherein, changing the execution sequence during runtime execution of the system of self-assembling software comprises blocking an execution programmed to occur.

12. The method of claim 9 wherein changing the execution sequence during runtime execution of the system of self-assembling software comprises executing code in at least one machine.

13. The method of claim 9 wherein changing the execution sequence during runtime execution of the system of self-assembling software occurs only when more than one bond has formed with said monitoring machine.

14. A computer system, comprising:
 a processor; and
 a data storage unit coupled to said processor, the data storage unit storing instructions that, if executed by the processor, will cause the processor to perform operations including:
  providing a computer-implemented system of self-assembling software including:
   a first machine having a first bonding site including a first identifier key;
   a second machine having a second bonding site including a second identifier key; and
   a hierarchy of encapsulants including a first encapsulant, wherein the first machine and the second machine self-assemble with one another after generation and during runtime execution of both the first machine and the second machine, wherein an execution sequence of the system of self-assembling software is formed at least in part by the first bonding site bonding to the second bonding site, wherein, before the first machine and the second machine self-assemble with one another, the first machine and the second machine each dynamically enter the first encapsulant during runtime execution of the system of self-assembling software, wherein the first encapsulant allows bonds to form only for pairs of bonding sites that are in the first encapsulant;
  providing an information manager to translate an event from a computer input means into at least one key change after the first machine and the second machine self-assemble, the at least one key change to change a value of one of the first identifier key and the second identifier key to alter the execution sequence during runtime execution of a system of self-assembled software, wherein the execution sequence is altered to add functionality to monitor the runtime execution of the system of self-assembled software; and
  displaying to a user by output means information from at least one of said machines.

15. The computer system of claim 14 wherein the information manager to pass data to a machine bound to the information manager to cause the at least one key change.

16. The computer system of claim 14 wherein the generated machine is an external override machine having a bonding site with an identifier key complementary to at least one identifier key of a machine in said system of self-assembling software, said external override machine to bond to said machine in said system of self-assembling software, said external override machine to alter code execution of said self-assembling software system.

17. The computer system of claim 14 wherein the at least one key change to change an identifier key to a value complementary to another identifier key in said self-assembling software system.

\* \* \* \* \*